May 5, 1959    F. BRUNKE    2,885,309
METHOD OF TEMPERING SELENIUM LAYERS FOR
SELENIUM RECTIFIERS AND PRODUCT
Filed May 23, 1955    2 Sheets-Sheet 1

Inventor:
FRITZ BRUNKE (deceased)
by ILSE I. BRUNKE
sole heir
BY  Taulmin & Taulmin
attorneys United States Patent Office 2,885,309
Patented May 5, 1959

2,885,309

METHOD OF TEMPERING SELENIUM LAYERS FOR SELENIUM RECTIFIERS AND PRODUCT

Fritz Brunke, deceased, late of Belecke, Moehne, Germany, by Ilse Irmgard Brunke, née Hecker, sole heir, Belecke, Moehne, Germany, assignor to Licentia Patent-Verwaltungs G.m.b.H., Hamburg, Germany Application May 23, 1955, Serial No. 510,102
In Germany October 31, 1949

Public Law 619, August 23, 1954
Patent expires October 31, 1969

20 Claims. (Cl. 117—200)

This invention relates to a method of tempering selenium layers for selenium rectifiers, more particularly to produce tempered selenium layers for manufacturing selenium rectifiers of the kind wherein a layer of selenium in crystalline form is deposited upon a base electrode, preferably after the latter has been coated with an intermediary layer, for instance of bismuth.

There are at least three allotropic modifications of solid selenium known in the art of using selenium for semi-conductive purposes, one being the vitreous or amorphous modification often referred to as $Se_I$, the second one being a crystalline modification $Se_{II}$ of high ohmic resistance, and the third being also a crystalline modification $Se_{III}$ which possesses, however, good electric conductivity. The two latter modifications are of gray color, and have melting points in the vicinity of 220° C.

This invention relates exclusively to a process involving the latter two crystalline modifications of selenium.

It is already known in the art to deposit a layer of crystalline selenium on a base electrode. This has, for instance, been done by electrolytic methods. However, the most frequently and now almost exclusively used methods in the art provide for depositing a crystalline layer of selenium by the condensation of selenium vapors.

According to the known methods the selenium layer thus deposited in crystalline form upon a base electrode is subjected to a heat treatment called "tempering" in the art. This "tempering" consists of heating the crystalline selenium layer which is originally of high ohmic resistance, for some time to an elevated temperature. Thus it has been proposed to heat the layer for about one hour to a temperature somewhat below, but in the vicinity of the melting point of selenium (220° C. for the hexagonal-rhombohedric, gray colored metallic modification of selenium).

The hitherto known heat treatment of this crystalline selenium is thus characterized by one single temperature value and effects the transformation of the crystalline selenium layer from its allotropic modification of high ohmic resistance, also symbolized as $Se_{II}$, to a modification which is a good electric conductor, and for which the symbol $Se_{III}$ may be used.

The known methods which provide for one single heat treatment of the crystalline $Se_{II}$ layer at a relatively high temperature in the vicinity of the melting point of selenium, and at least above 200° C., have the drawback that during this heat treatment the temperature of the selenium layer will exceed the melting point of selenium, at least in parts of the layer due to the following reasons: when the crystalline selenium layer is converted from the highly resistant modification to that of good electric conductivity, a considerable amount of heat is released which may easily cause the temperature to rise above the melting point of selenium, especially in the center of big selenium layers on said base electrodes of big dimensions. Therefore, such plates comprising a crystalline selenium layer on a base electrode, even when tempered in a big thermostat having a uniform wall temperature of, for instance, 218° C., will frequently show, particularly in their central region, areas which had been molten during the tempering process, due to the released latent heat of transformation, as the melting point of the selenium was only about 2 centigrades above the temperature applied during the heat treatment. After resolidification during cooling of the plate, such areas which had been temporarily melted do not show the desired high blocking voltage.

A number of other methods for making rectifiers having a selenium intermediate layer between two electrodes have also been proposed wherein the selenium layer is deposited on a base electrode in the form of amorphous or vitreous selenium $Se_I$. In all of these methods a first heat treatment is required to convert the $Se_I$ modification to the crystalline modification $Se_{II}$. Then only is the conversion of $Se_{II}$ to $Se_{III}$ achieved by a further heating step.

However in all such methods, as they are disclosed for instance, in the Swiss Patent 239,449, the German Patents 589,126 and 742,762, and the U.S. Patents 2,124,306 and 2,462,906, the transformation of the modification $Se_{II}$ of selenium to that of $Se_{III}$ follows that of $Se_I$ to $Se_{II}$, and is carried out in all the aforementioned cases in one single step below, but close to the melting temperature of the crystalline modifications of selenium (approximately 220° C.). Therefore, in all of these cases the same drawbacks will occur which have been explained hereinbefore.

It is an object of this invention to overcome these drawbacks by a new method of carrying out the transformation of crystalline selenium from the modification of $Se_{II}$ to the modification of $Se_{III}$.

It is another object of my invention to provide a method of tempering selenium layers for selenium rectifiers of uniformly high blocking potential.

It is a further object of my invention to provide a method of tempering layers of crystalline selenium of the modification $Se_{II}$ on a base electrode to convert the selenium in these layers to the modification $Se_{III}$ showing good electric conductivity and a uniformly high blocking voltage.

It is yet another object of my invention to prevent the partial melting of a crystalline solenium layer deposited on a base electrode during the step of converting the selenium in the layer from a modification $Se_{II}$ having a high ohmic resistance to a modification $Se_{III}$ possessing a desired high blocking voltage.

The invention provides a method for transforming a crystalline selenium layer deposited on a base electrode from the $Se_{II}$ modification of high ohmic resistance to the $Se_{III}$ modification having uniform properties of good electric conductivity and a uniformly high blocking capacity by subjecting the selenium layer to a heat treatment carried out in two steps, which comprise as a first step heating the crystalline selenium of $Se_{II}$ layer to a temperature between 180 and 200° C. for good electric conductivity. The subsequent second heat treatment at a temperature between 200 and 220° C. affects the selenium layer in such a manner as to impart to the same an increased blocking capacity. The blocking voltage may amount to 60 volts or more.

Since it is of decisive importance in the method according to my invention, that no area of the selenium covered plates is heated above the melting point of crystalline selenium during the transformation which the same undergoes during the "tempering" process, it is necessary to provide for an adequate removal of the released latent heat of transformation at a minimum temperature interval. For this purpose a heating device according to my invention comprises a container partially filled with a suitable heating liquid. A number of pockets or niches are provided in one sidewall or the top plate of the container which pockets are freely accessible from the outside so that the plates coated with crystalline selenium to be tempered can be freely introduced therein.

The pockets are of a narrow diameter and correspond in width and depth to the size of the plates to be treated. The pockets are preferably arranged with their broad wall surfaces in oblique position so that a plate may be introduced slidingly and will rest on the lower broad surface of each pocket. Heat is transmitted to each plate from the liquid in the interior of the container through the walls of the pocket. The temperature of the liquid is maintained constant by a heating device which is controlled thermostatically, and is set according to the temperature required for the first or for the second step in the method according to my invention. The temperature of the pocket walls can be further controlled and adjusted to the desired value by heated air which is moved, and preferably circulated through the pockets. Air circulation must take place at a speed sufficient to remove considerable quantities of heat as soon as small differences of temperature occur between the heated air and the walls of the pocket, which difference will be due to released conversion heat from the plates which will slightly raise the wall temperature.

The same object is achieved in a preferred mode of operation by using a boiling liquid in the interior of the container. The pockets are so arranged that the surfaces of their walls in the interior of the container are immersed in the liquid to be caused to boil. Any increased amount of heat, such as released conversion heat, supplied through the walls of the pocket will cause an additional evaporation of liquid, thereby preventing any appreciable increase in the temperature of the pocket walls. Therefore, the selenium-coated base electrode which is in good heat-conductive contact with the lower wall of the pocket, will be kept at the desired even temperature throughout the step of converting the selenium layer to the modification of good electric conductivity.

According to another mode of operation, the container is only filled with liquid to a level below the lowermost end of the pockets, so that the latter remain entirely within the upper part of the container filled with vapors from the evaporating liquid.

When a new charge of unheated plates covered with a crystalline selenium layer is introduced into the pockets, the drop in temperature in the pocket wall causes a condensation of vapors on the surfaces of the pocket walls inside the container. As soon as the conversion of selenium begins, a heat transfer in opposite direction will take place, whereby the larger part of the released conversion heat is adducted through the pocket walls and causes the condensed liquid on the wall surfaces in the interior of the container to re-evaporate, thus preventing any appreciable increase of temperature of the plates.

Various liquids may be employed for the two steps of the method according to my invention, aniline being particularly suitable for the first step, and naphthalene, and in particular diphenyl being suitable for the second tempering step.

Instead of using two liquids, one single evaporating liquid may be used which is caused to boil at a constant reduced pressure. The boiling point of the liquid can be adjusted from that required for the first step of my method to that necessary during the second step by a corresponding change in the pressure above the liquid. A liquid which has given satisfactory results, is methyl salicylate.

In the drawings—

Figure 1:
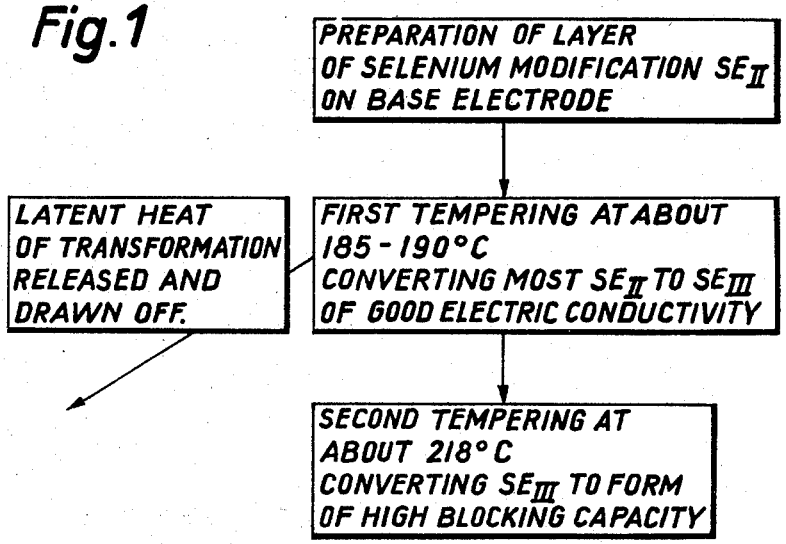
Figure 1 is a flow sheet showing the steps of the method according to my invention.
Figure 2:
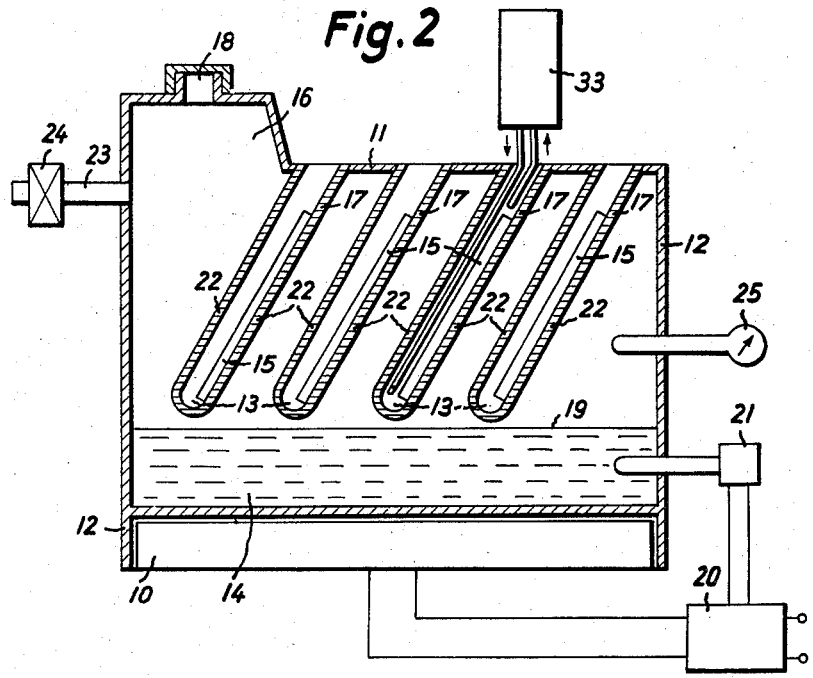
Figure 2 shows a cross sectional view of the apparatus according to my invention.

Referring now to the drawings more in detail and in particular to Figure 2, reference numeral 10 indicates a heating device such as for instance, an electrical resistance heating plate, which serves to heat the walls 12 of the container. In the top plate 11 of the container a number of pockets 13 extend downwardly at an oblique angle into the interior of the container. The selenium coated plates 15 are introduced into the upper openings of the pockets 13 and come to rest on the lower broad-surfaced walls 17 of pockets 13. Through a filling device 18 a liquid 14 is filled into the container in such amount that its upper level 19 remains somewhat below the lower ends of the pockets 13. Heated air can be circulated through the pockets by an air heating and circulating means schematically indicated at 33.

Control means 20, which are influenced by a temperature control device 21 extending into the liquid 14, adjust the heating effect of the heating device 10 so that the liquid is maintained constantly boiling without overheating the vapors in the vapor chamber 16 forming the upper part of the interior of the container. Liquid will condense on the surface 22 of the pocket walls, whenever a new charge of unheated plates 15 is introduced into the pockets 13.

The boiling point of the liquid may be adjusted by reducing the pressure in the vapor chamber 16 through partial evaporation through conduit 23 which is provided with a valve 24 and leads to a vacuum pump (not shown). Pressure in the vapor chamber 16 is controlled by means of a pressure gauge 25.

Figure 3:
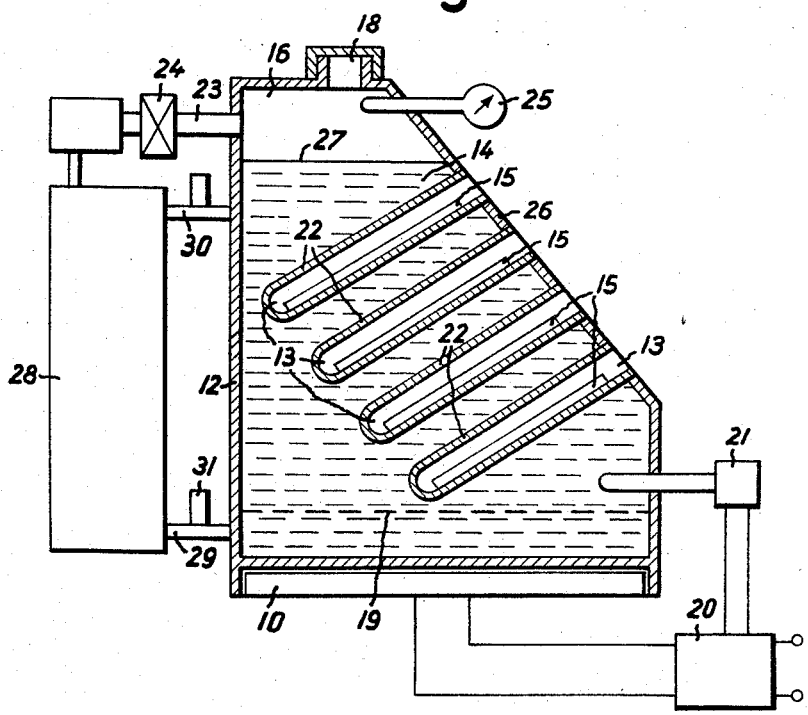
Figure 3 shows another embodiment of the apparatus.

In the embodiment shown in Figure 3, pockets 13 are arranged in a slanted side wall 26 of the container. The liquid 14 may be filled to the same level 19 below the lowermost end of the pockets 13 as was the case in Figure 2. Or it may be filled to the level 27 thereby completely immersing the interior walls 22 of the pockets 13 in the liquid. Temperature control, as well as changing of the boiling point by adjustment of the pressure in the vapor chamber 16 may be carried out as in Figure 2. On the other hand it is also possible to heat the liquid in a separate thermostat 28 and circulate the same through conduits 29, 30 to and from the container. Temperature control means 31, 32 may be provided in conduits 29, 30.

The arrangements according to Figures 2 and 3 particularly facilitate the mass production of uniform selenium rectifier plates, uniformity being achieved with great accuracy and at low costs. The arrangement of Figure 3 also greatly facilitates the introduction into, and the removal of the plates from the tempering pockets.

In accordance with a more specific useful feature of this invention a selenium layer deposited in crystalline form upon a base electrode is subjected to a heat-treatment carried out in two steps comprising the first one of heating said selenium layer to a temperature between about 185 and 190° C. so as to substantially completely transform the crystallites in said crystalline selenium layer; and the second one of heating said selenium layer for at least 10 minutes to a temperature of about 218° C.

Another specific embodiment of this invention comprises a heat treatment by heating a selenium layer deposited in crystalline form upon a base electrode first to a temperature between 180 and 200° C. so as to substantially completely transform the crystallites in said crystalline selenium layer; and secondly heating said selenium layer for about 30 minutes to a temperature of about 218° C.

Further on a preferred embodiment of this invention is heat treating a selenium layer which is deposited on a base electrode in crystalline form after said electrode is coated with an intermediary layer in two steps, comprising one of first heating said selenium layer to a temperature between 180 and 200° C. so as to substantially completely transform the crystallites in said crystalline selenium layer; and secondly heating said selenium layer for at least 10 minutes to a temperature between 200 and 220° C.

In accordance with another feature of this invention is tempering a selenium layer for a selenium rectifier by tempering the selenium layer which is deposited in crystalline form upon a base electrode coated with an intermediary layer, at a temperature between 150° C. and the melting point of crystalline selenium, comprising the steps of first heating said selenium layer to a temperature between 180 and 200° C. so as to substantially completely transform the crystallites in said crystalline selenium layer; and secondly heating said selenium layer for about 30 minutes to a temperature of about 218° C.

It will be understood that this invention is susceptible to modification in order to adapt it to different usages and conditions, and, accordingly, it is desired to comprehend such modifications within this invention as may fall within the scope of the appended claims.

What is claimed is:

1. A method of tempering the selenium layer for a selenium rectifier by tempering the selenium layer deposited in crystalline form upon a base electrode, at a temperature between 150° C. and the melting point of crystalline selenium, comprising the steps of first heating said selenium layer to a temperature between 180 and 200° C. so as to substantially completely transform the crystallites in said crystalline selenium layer; said secondly heating said selenium layer for at least 10 minutes to a temperature between 200 and 220° C.

2. In a dry rectifier, a base electrode having a tempered selenium layer consisting of crystalline selenium of uniformly good electric conductivity and a uniformly high blocking potential of at least 60 volts due to said layer being free from recrystallized areas of inferior blocking effect, said layer having been tempered by the method described in claim 1.

3. In a method of tempering the selenium layer for a selenium rectifier as described in claim 1, the step of introducing said base electrode provided with said layer of crystalline selenium in a first chamber whose walls are maintained at a constant temperature between 180 and 200° C. by means of a boiling liquid contacting the surface of said walls opposite said base electrode provided with said layer of crystalline selenium, and the step of thereafter introducing said base electrode provided with said layer of crystalline selenium in a second chamber whose walls are maintained at a constant temperature between 200 and 220° C. by means of boiling liquid contacting the surface of said walls opposite said base electrode provided with said layer of crystalline selenium.

4. In a method as described in claim 3, the steps of heating the walls of said first and said second chambers by boiling liquids, and the step of adjusting the boiling point of said boiling liquids in each of said chambers by correspondingly adjusting the vapor pressure above the surface of said liquids.

5. In a method as described in claim 4, the step of maintaining the pressure above said boiling liquid at values below one atmosphere.

6. In a method as described in claim 3, the steps of heating the walls of said first and said second chambers by the same boiling liquid, and the step of changing the boiling point of said liquid for heating said first chamber to the boiling point for heating said second chamber by correspondingly changing the pressure above the surface of said liquid.

7. In a method as described in claim 6, the step of maintaining the pressure above said boiling liquid at values below one atmosphere.

8. A method as described in claim 6, characterized in that said boiling liquid is methyl salicylate.

9. A method as described in claim 6, characterized in that said boiling liquid is diphenyl.

10. In a method of tempering the selenium layer for a selenium rectifier as described in claim 1, the step of introducing plates consisting of base electrodes provided with said layers of crystalline selenium in a first chamber whose walls are maintained at a constant temperature between 180 and 200° C. by means of a first boiling liquid contacting the surface of said walls opposite said plates, and the step of thereafter introducing said plates in a second chamber whose walls are maintained at a constant temperature between 200 and 220° C. by means of a second boiling liquid contacting the surface of said walls opposite said plates.

11. In a method as described in claim 10, characterized in that said first boiling liquid is aniline, and said second boiling liquid is naphthalene.

12. A method of tempering the selenium layer for a selenium rectifier by tempering the selenium layer deposited in crystalline form upon a base electrode, at a temperature between 150° C. and the melting point of crystalline selenium, comprising the steps of first heating said selenium layer to a temperature between 180 and 200° C. so as to substantially completely transform the crystallites in said crystalline selenium layer; and secondly heating said selenium layer for at least 10 minutes to a temperature of about 218° C.

13. A method of tempering the selenium layer for a selenium rectifier by tempering the selenium layer deposited in crystalline form upon a base electrode, at a temperature between 150° C. and the melting point of crystalline selenium, comprising the steps of first heating said selenium layer to a temperature between 180 and 200° C. so as to substantially completely transform the crystallites in said crystalline selenium layer; and secondly heating said selenium layer for about 30 minutes to a temperature of about 218° C.

14. A method of tempering the selenium layer for a selenium rectifier by tempering the selenium layer deposited in crystalline form upon a base electrode, at a temperature between 150° C. and the melting point of crystalline selenium, comprising the steps of first heating said selenium layer to a temperature between about 185 and 190° C. so as to substantially completely transform the crystallites in said crystalline selenium layer; and secondly heating said selenium layer for at least 10 minutes to a temperature of about 218° C.

15. A method of tempering the selenium layer for a selenium rectifier by tempering the selenium layer deposited in crystalline form upon a base electrode, at a temperature between 150° C. and the melting point of crystalline selenium, comprising the steps of first heating said selenium layer to a temperature between about 185 and 190° C. so as to substantially completely transform the crystallites in said crystalline selenium layer; and secondly heating said selenium layer for about 30 minutes to a temperature of about 218° C.

16. A method of tempering the selenium layer for a selenium rectifier by tempering the selenium layer which is deposited in crystalline form upon a base electrode coated with an intermediary layer, at a temperature between 150° C. and the melting point of crystalline selenium, comprising the steps of first heating said selenium layer to a temperature between 180 and 200° C. so as to substantially completely transform the crystallites in said crystalline selenium layer; and secondly heating said selenium layer for at least 10 minutes to a temperature between 200 and 220° C.

17. A method of tempering the selenium layer for a selenium rectifier by tempering the selenium layer which is deposited in crystalline form upon a base electrode coated with an intermediary layer, at a temperature between 150° C. and the melting point of crystalline selenium, comprising the steps of first heating said selenium layer to a temperature between 180 and 200° C. so as to substantially completely transform the crystallites in said crystalline selenium layer; and secondly heating said selenium layer for at least 10 minutes to a temperature of about 218° C.

18. A method of tempering the selenium layer for a selenium rectifier by tempering the selenium layer which is deposited in crystalline form upon a base electrode coated with an intermediary layer, at a temperature between 150° C. and the melting point of crystalline selenium, comprising the steps of first heating said selenium, comprising the steps of first heating said selenium layer to a temperature between 180 and 200° C. so as to substantially completely transform the crystallites in said crystalline selenium layer; and secondly heating said selenium layer for about 30 minutes to a temperature of about 218° C.

19. A method of tempering the selenium layer for a selenium rectifier by tempering the selenium layer which is deposited in crystalline form upon a base electrode coated with an intermediary layer, at a temperature between 150° C. and the melting point of crystalline selenium, comprising the steps of first heating said selenium layer to a temperature between about 185 and 190° C. so as to substantially completely transform the crystallites in said crystalline selenium layer; and secondly heating said selenium layer for at least 10 minutes to a temperature of about 218° C.

20. A method of tempering the selenium layer for a selenium rectifier by tempering the selenium layer which is deposited in crystalline form upon a base electrode coated with an intermediary layer, at a temperature between 150° C. and the melting point of crystalline selenium, comprising the steps of first heating said selenium layer to a temperature between about 185 and 190° C. so as to substantially completely transform the crystallites in said crystalline selenium layer; and secondly heating said selenium layer for about 30 minutes a temperature of about 218° C.

References Cited in the file of this patent

UNITED STATES PATENTS

| | | |
|---|---|---|
| 1,764,197 | Bruehl | June 17, 1930 |
| 2,349,439 | Koppers | May 23, 1944 |
| 2,413,013 | Von Hippel | Dec. 24, 1946 |
| 2,457,169 | Miller et al. | Dec. 28, 1948 |
| 2,575,392 | Peters et al. | Nov. 20, 1951 |